United States Patent

Johnson

Patent Number: 5,592,894
Date of Patent: Jan. 14, 1997

[54] SPIDERCRAFT

[76] Inventor: Herrick J. Johnson, R.R. 5 Box 2392, Brunswick, Me. 04011

[21] Appl. No.: 346,493

[22] Filed: Nov. 29, 1994

[51] Int. Cl.⁶ ........................................ B63B 35/00
[52] U.S. Cl. ........................... 114/270; 114/274; 114/283; 440/100
[58] Field of Search ............... 440/37, 100; 114/61, 114/274, 270, 283

[56] References Cited

U.S. PATENT DOCUMENTS

| | | | |
|---|---|---|---|
| 1,107,260 | 2/1914 | Burney | 114/274 |
| 2,347,959 | 5/1944 | Moore et al. | 114/283 |
| 3,173,509 | 3/1965 | Wernicke | 180/116 |
| 3,208,543 | 9/1965 | Crowley | 180/116 |
| 3,965,836 | 7/1976 | Malvestutu | 114/272 |
| 4,016,826 | 4/1977 | Sanders | 115/19 |
| 4,669,408 | 6/1987 | Schad | 114/283 |
| 4,685,641 | 8/1987 | Kirsh | 224/105 |
| 4,926,773 | 5/1990 | Manor | 114/56 |
| 4,926,778 | 5/1990 | Johnston | 114/271 |
| 5,031,679 | 7/1991 | Shoner | 152/336 |
| 5,111,766 | 5/1992 | Ortemond | 114/273 |
| 5,125,470 | 6/1992 | Saunders | 180/116 |
| 5,181,478 | 1/1993 | Berardi | 114/270 |
| 5,311,832 | 5/1994 | Payne | 114/274 |
| 5,314,035 | 5/1994 | Schoell | 180/119 |
| 5,335,742 | 8/1994 | Blum | 114/274 |

FOREIGN PATENT DOCUMENTS

308295  12/1928  United Kingdom ............... 440/100

*Primary Examiner*—Jesus D. Sotelo

[57] ABSTRACT

A spidercraft supported by a wave rider pod consisting of very large tires and ground effect wings connected to a suspension system to absorb the shocks from planing over rough seas or rolling over rough terrain. It is a craft which possesses at least one hull or cabin, at least one support arm with a suspension system, and at least one flotation tire. The suspension system with springs and shock absorbers allows the wave rider pod to move in concert with the waves or rough terrain while the cabin of the craft remains relatively stable.

14 Claims, 11 Drawing Sheets

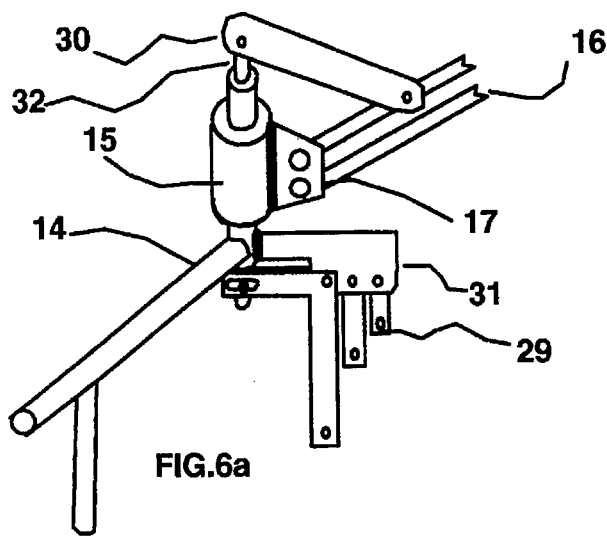
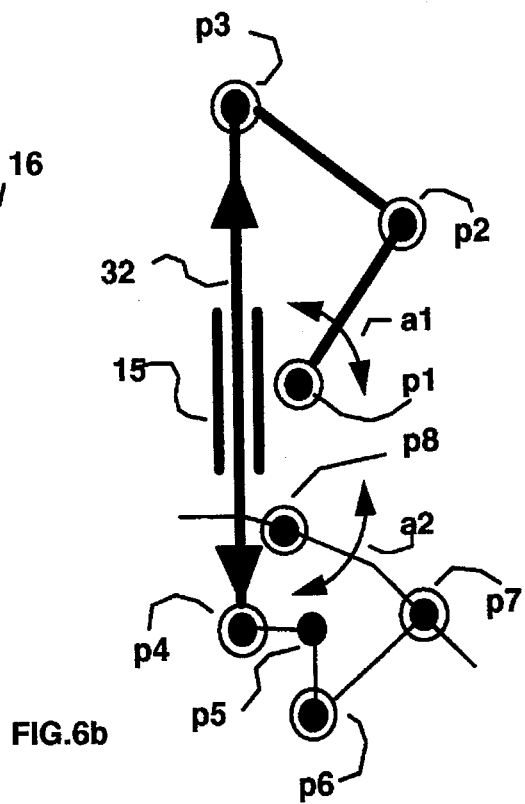
FIG.6a
FIG.6b

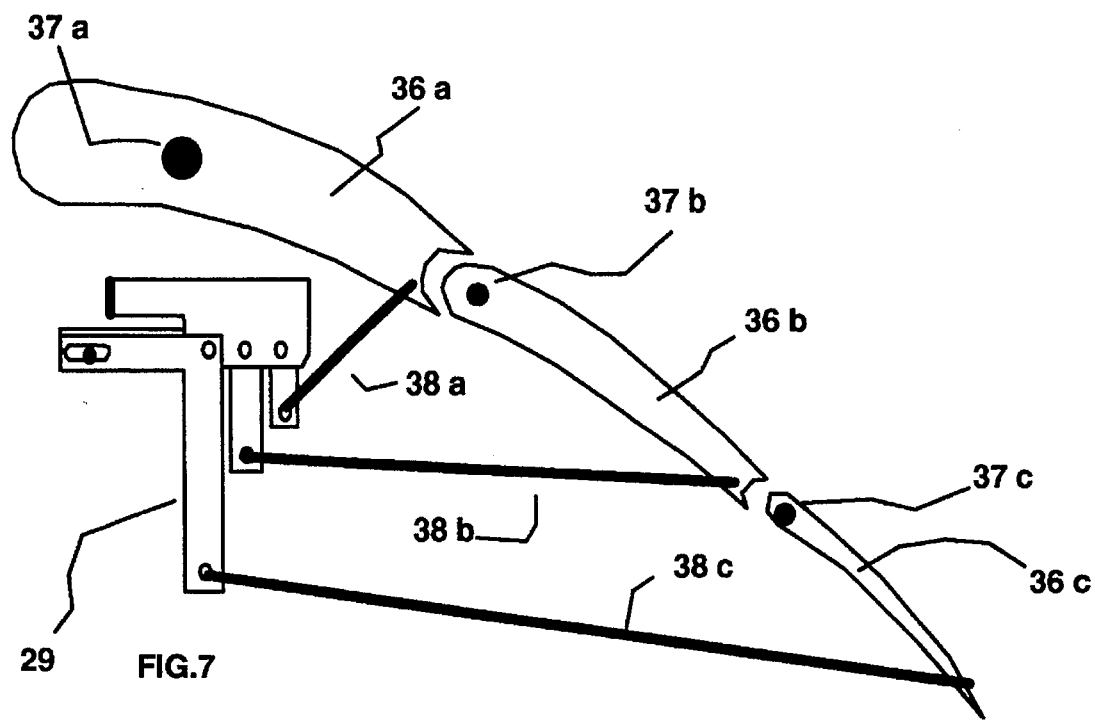

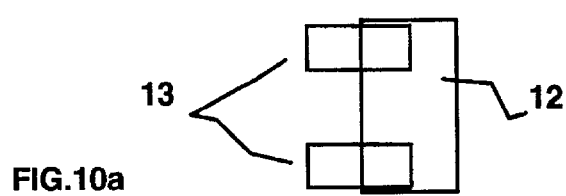
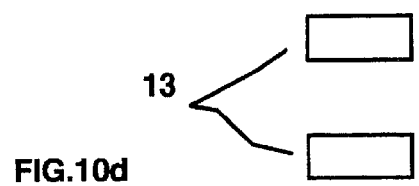
FIG.10a　　　　　　　　　　FIG.10d
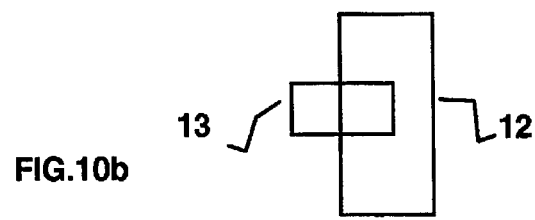
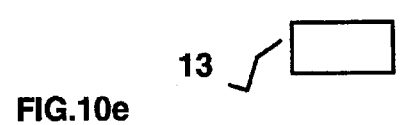
FIG.10b　　　　　　　　　　FIG.10e
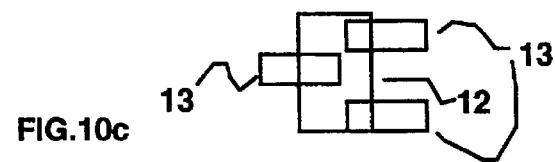
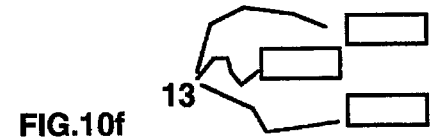
FIG.10c　　　　　　　　　　FIG.10f

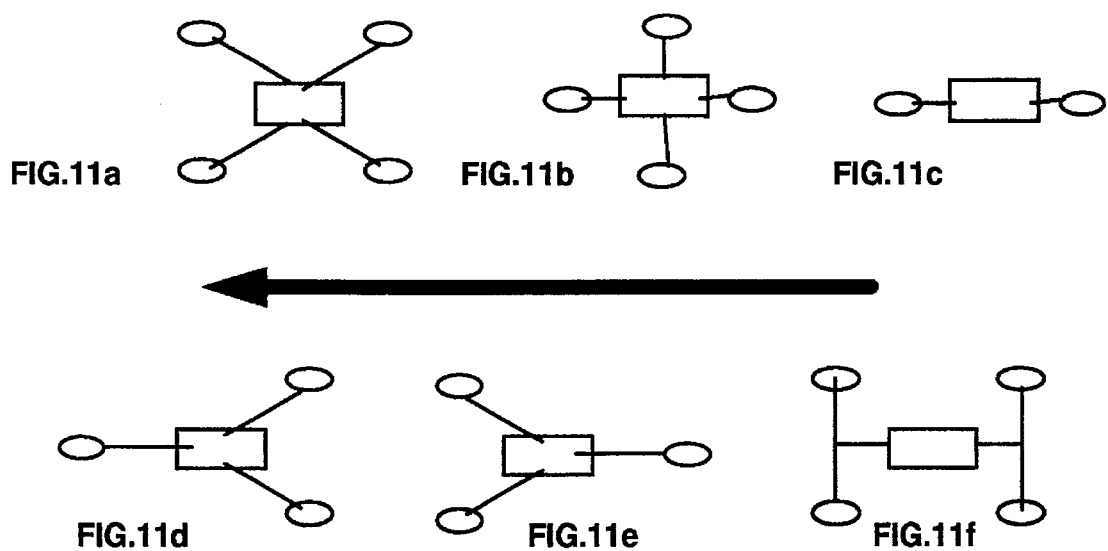

SPIDERCRAFT

FIELD OF THE INVENTION

This invention relates generally to Advanced Marine Vehicles ("AMV") and specifically to planing watercraft with suspension systems, floatation tires and ground effect wings, operating at high speeds over rough water.

BACKGROUND

Throughout the centuries man has searched for ways to travel over uneven soft surfaces like water. We have found that it is difficult to (1) travel fast, (2) operate over water, land, ice, mud, snow and soft sand. (3) operate with minimal drag in all these environments, (4) remain stable while stationary or moving, (5) operate without docking facilities, (6) operate with minimum potential damage to life and property in these environments and (7) adapt to many load conditions and configurations. This new category of spidercraft vessel is designed to address all of these constraints.

All known vehicles have problems in at least one of these operating environments or must slow down to a fraction of their maximum speed over rough terrain. This patent application reviews the prior art for vehicles making claims for travel over water, and contrasts their abilities with the claims for the new spidercraft field of invention. The amphibian craft have problems going fast and are typically unable to handle seas well at any speed. Today's advanced marine vehicles (AVM's) for operation at high speeds in or above rough water include speed boats, hydroplanes, and hovercraft. In addition there are aircraft that fly close to the water and have at least one wing in ground effect (WIG). All of these designs require some form of docking facilities to aid in loading and unloading and require a trailer or hoist for removal from the water.

AMV—Planing Hull Craft

Speed boats are usually planing hull sport vessels that attain speeds of fifty miles per hour. At rest a planing hull craft is supported by the displacement of water. When it is accelerated it will eventually climb over the bow wave and start to slide over the water. In essence the water is no longer able to flow out of the way of the hull so the hull planes over it. There is a large body of prior art describing improvements to planing hull performance, for example U.S. Pat. No. 3,965,836 (Malvestuto). There are any number of air insertion passive and active devices to trap air under a planing hull all designed to reduce the friction between the hull and the water. For example, U.S. Pat. No. 4,669,408 (Schad) discusses skis under an air propelled planing hull. None of these use an appropriately shaped flotation tire to reduce friction.

It has also not gone unnoticed that it takes less energy to get lift from a compressible fluid like air than water. U.S. Pat. No. 5,111,766 (Ortemond) uses a fixed wing over a traditional catamaran planing hull to help the vessel out of the water and minimize drag. However, Ortemond does not understand the concepts of ground effect and has the wing above the vessel which provides a cushion to prevent the extra lift provided by compressing the air against the water or ground. In addition Ortemond does not deal with shock absorption at all. U.S. Pat. No. 5,029,584 (Bernitsyn) has a high speed craft with ground effect wings as well but the wings are effectively positioned to take advantage of the boundary layer. Unfortunately Bernitsyn also does not deal with shock absorption.

U.S. Pat. No. 4,926,773 (Manor) has proposed a high performance vessel with air foil wings on each side of a main hull with twin pontoon hulls attached to the outer edges of the wings. In addition a small hydrofoil under the main hull provides steering and stabilization. The design will assist in raising the hulls out of the water reducing its drag. Unfortunately, Manor does not deal with the problems caused by the wave effect at high speeds nor are submerged objects addressed.

U.S. Pat. No. 5,314,035 (Schoell) is more adventuresome. He has proposed a vessel with swept forward main and canard wings to capture the ground effect lift. Schoell has proposed systems to stabilize the aerodynamically unstable "wing swept forward" design. Schoell also proposes water ski like devices at the wing tip to slide over the water. These skis will work under way in calm water to stabilize the craft. Unfortunately, there is no provision for stability in the stationary position nor, like Manor before him, Schoell does not provide any shock absorption system to handle waves.

To help in the stabilization and control of speed boats U.S. Pat. No. 4,926,778 (Johnston) have developed aerodynamic stabilization systems for watercraft. These dampen the pitching and rolling of a planing hull by providing counter force using airfoils to compensate for the wave action. These help in high speed planing hull craft however, the structural strain of crashing a lightweight vessel into large seas restricts the usefulness of stabilization systems to relatively low wave situations.

Some of these planing hull inventions are able to travel fast but none are capable of operating over water, land, ice, mud, snow and soft sand. Most of these planning hull inventions work to minimize the drag on the hull but none comes close to the friction reduction of the good old wheel. None of these planing hulls while moving and stationary have active stability equipment, although some of them have improved stability under way. All of the planing hull craft require docking facilities. And finally all planing hull craft are susceptible to submerged object damage endangering property and life whenever they are operated. However, they are mechanically simple and offer a wide range of adaptability and operating load ranges.

AMV—Hydrofoil Craft

Hydrofoil craft are boats which typically possess a more or less conventional planing hull and which have one or more vertically struts extending from beneath the hull into the water. U.S. Pat. No. 1,107,260 (Burney) set forth the basic idea of each vertical strut typically having at least one foil or hydroped as he named them. When the hydrofoil craft is accelerated to a sufficient velocity through the water the lift created by the foils raises the hull above the water's surface, thus eliminating the hull's resistance.

Hydrofoils do some what better at the top speed in rough water because the foils are smaller than a hull and run under the surface of the waves. The force of the wave pitching a vessel is proportional to the surface area in the wave effect. Hydrofoils minimize the surface area in contact with the wave and therefore minimize the wave effect. Unfortunately large waves have deep roots that create local up and down drafts or pressure fronts which cause the hydrofoil to pitch just like a speed boat in heavy seas.

U.S. Pat. No. 5,311,832 (Payne) discusses in detail the concepts of added mass, local acceleration of a wave, and techniques to compensate for the effect on a foil. Payne proposes in his patent to dampen the vertical acceleration of a foil by pivoting the foil using the added mass effects of either water or air. In simple terms, Payne uses another foil to modify the angle of attack on the main foil.

In addition Payne proposes dampening the shocks using common suspension and spring techniques. These should create a smother ride than expected without these techniques. Unfortunately, this device depends on mechanical pivots, levers and foils under the surface of the water where they become maintenance problems as well as susceptible to damage from common underwater hazards.

In summary, although a hydrofoil craft can travel fast over smooth water, it has difficulty going fast in rough seas. Further, it can not operate over land, ice, mud, snow and soft sand. The reduced surface area means it can operate with minimal drag in water but the lack of flexibility in loading limits its applicability. Further, because all suspension systems proposed above are inactive while the hull is stationary they have no effect. The combination of struts and foils underwater make it susceptible to underwater damage and it certainly can not travel on land.

AMV—Hovercraft

Hovercraft ride on a cushion of air contained in a skirt around the bottom of the ship. Hovercraft are constructed in two basic configurations. U.S. Pat. No. 3,173,509 (Wernicke) described the basic functionality and U.S. Pat. No. 3,208,543 (Crowley) extended the control of hovercraft. The fans that drive the craft can either be rotating horizontally or vertically. The typical horizontal orientation provides for good maneuverability and ducts some of the air under the craft for lift. A vertical orientation shrouds the fan and creates a safe environment for passengers. U.S. Pat. No. 5,125,470 (Saunders) discusses in detail how to make a horizontal fan configuration more controllable by ducting the air between lift and propulsion.

Hovercraft perform very well in small to moderate waves because the air cushion insulates the passengers from the wave shock. Unfortunately for the hovercraft, when the seas reach a certain height the skirt looses contact with the water in the troughs of the waves and the air cushion gushes out. Many patents discuss multiple ways to help the seal around the skirt. These may help but the skirt contact with the waves, however it is the constraining design difficulty for hovercraft and high seas.

Hovercraft also too must slow down in rough water. In addition, they can operate over water, ice, mud, snow and soft sand for limited distances, however, they have difficulty with uneven surfaces like rocks, ice packs or high waves. The hovercraft reduce the drag by pumping air under the hull so when they are stationary they loose the cushion and wallow in the sea. Another problem with hovercraft is they do not handle well although they are very adaptable.

AMV—Summary of Prior Art

All the AMV prior art refers to devices for reducing drag on a hull surface. Some discuss shock absorption and stability but all using a more or less conventional hull and foil or wing. None of these previous inventors uses flotation tires both to support a hull and reduce friction. In my opinion they have been looking at improving the conventional hull and not at solving a transportation problem.

WIG

Wing in Ground effect (WIG) vessels are "flying boats" intended to cruise just above wave crests so as to avoid all but very occasional water contact during flight. Wig aircraft possess one or more wings which are generally larger than the foils of hydrofoil craft. When a WIG aircraft has accelerated to a sufficient velocity through the water, the aerodynmnic lift created by the se wings lifts the aircraft entirely our of the water. WIGs fly close to the water so that the increased lift efficiency provides transportation with less drag than they would encounter at higher altitudes.

U.S. Pat. No. 4,685,641 (Kirsh) proposes a WIG with a suspension system. The craft has three skis, one under each side of the wing aft of a single nose ski. These skies are suspended from pivot points which actuate attitude adjustments in the ground effect wings. This shock absorbing suspension in combination with skis adjusting the attitude of the air foils makes this an interesting design. Unfortunately, there is a balance problem inherent in this design proposed by Kirsh. Further, there is no provision for any land travel nor is there any protection against submerged objects.

U.S. Pat. No. 5,335,742 (Blum) is a more typical WIG craft where the hull is flanked by wings with propulsion units driving air under the wings. Blum does not propose to deal with the local updraft and down drafts of air over water. Therefore the vessel does not have any shock absorbers. Nor does it have any land travel capabilities.

In summary, WIG aircraft are still theoretical but they should travel fast and operate over water, land, ice, mud, snow and soft sand. Their drag to lift ratios are very good but they require smooth surfaces to land and take off. They also have technical difficulties in rough air commonly found over waves and other irregular terrains. Their load flexibility is similar to airplanes so they are only useful for high value cargoes at this time. The WIG designers seem preoccupied with making an existing airplane concept fly close to the ground and have not looked at land bound vehicle design for solutions.

Amphibians

Some highway vehicles (commonly called amphibians) have water-tight bodies, can float and make slow progress in smooth water. U.S. Pat. No. 5,181,478 (Berardi) is an example of an amphibious highway vehicle where the wheels tilt into the body to reduce drag and improve over water speed. These amphibians do not use the wheels as flotation aids, use traditional displacement hulls for floatation and have high speed performance problems in smooth and rough water. The size and shape of the amphibians is constrained by highway regulations. Therefore, they are primarily designed to travel on highways with limited water travel and certainly not travel in heavy seas.

In summary, amphibians do not travel fast and are limited to water or land operations. They do very poorly over ice, mud, snow or soft sand. They have maximum drag in water and they wallow like a pig in rough conditions. They tend to be overloaded without much cargo and because of the road limit on width they are not very stable or safe. The amphibian designers appear to be constrained to the size limitations imposed by highways and therefore have not considered relaxing them to solve transportation problems on water, ice, mud, snow or soft sand.

Spidercraft

A related patent to amphibious craft is U.S. Pat. No. 4,016,826 (Sanders). Sanders proposes a four wheel water vehicle with tires that float the weight of a human. The so called Water Spider is propelled by a crank system spinning the wheels which have veins attached. It is a mystery how Sanders proposes to steer the craft. However, it is for slow speed recreational use. It has no suspension system for heavy seas nor is it capable of high speed. However, it is the first incident of a wheeled flotation vehicle in the art and is worthy naming this class of vessels "Spidercraft" in its honor.

Although Sanders did not include details about how the Water Spider flotation tires were constructed there is considerable prior art in the area. In particular U.S. Pat. No. 3,907,018 (Fajikawa) and U.S. Pat. No. 5,031,679 (Shoner) discuss foam rubber filled tires. These synthetic foam tire inserts for flat proof tires could be used for flotation. However, Fajikawa patented a method for filling existing casings in 1975 and Shoner patented the idea for filling tires to prevent flats in 1991. However, all the patents in the foam filled tire area deal with filling auto and construction tires with foam to prevent flats not with shaping flotation devices. Another high speed water craft called a Water Spider is U.S. Pat. No. 2,347,959 (Moore). In this patent Moore discusses a pontoon based high speed vessel which does have a parallelogram suspension system, ground effects wings and an air propeller. It does not have flotation tires nor does it have adjustable ground effects wings to mitigate the forces of the waves. Further, the wings are attached to the cabin of the vessel to "help shield the propeller from spray . . . " not to the pontoons to provide stability and lift. In addition the pontoons can not operate, even temporally, on land A third spider craft Great Britain Pat. No. 308295 (Cantono) discusses a modification to ship's paddle wheels. However the art which accompanies the patent includes a passenger cabin, suspension system, and flotation paddle wheels. The power is supplied to the flotation paddle wheels and the paddles will presumably lift the vessel out of the water and propel it forward over the water. However, it does not anticipate the use of ground effect wings or control surfaces. The proposed flotation paddle wheels are made of "a floating drum. with paddles conveniently arranged on its periphery." Cantono does not anticipate the use of pneumatic type tires which can deform with the shocks of the waves. The arrangement of paddles on the wheels also prevents the craft from operation on land or surfaces other than water.

PRIOR ART SUMMARY

It appears from the prior art that no invention has a satisfactory solution for travailing over water, land, ice, mud, snow and soft sand without slowing down for rough conditions. The AMV section works primarily on how to reduce friction and improve stability, the WIG section works on stability without regard for docking restrictions, and the amphibious section works on better performance. All the elements required to solve the seven design requirements I outlined in the introduction have been introduced in one form or another in prior art. Although not anticipated in any of the prior art, this new use or combination of elements produces a vehicle that can (1) travel fast, (2) operate over water, land, ice, mud, snow and soft sand. (3) operate with minimal drag in all these environments, (4) remain stable while stationary or moving, (5) operate without docking facilities, (6) operate with minimum potential loss of life and property in these environments and (7) is adaptable to many configurations and load conditions.

OBJECTS AND ADVANTAGES

Accordingly, several objects and advantages of my invention are it can (1) travel fast, (2) operate over water, land, ice, mud, snow and soft sand. (3) operate with minimal drag in all these environments, (4) remain stable while stationary or moving, (5) operate without docking facilities, (6) operate with minimum potential damage to life and property in these environments and (7) is adaptable to many configurations and load conditions.

A spidercraft can travel fast because it has friction reducing bearings supporting floatation tires on wave rider pods. Further, a suspension system allows a passenger cabin to stay relatively stable even in rough terrains like high seas or ice flows. Power can be applied with any conventional means but air propeller driven with reliable internal combustion engines is the preferred embodiment. This will allow enough thrust to move a spider craft at high speed.

A spidercraft can travel over water, land, ice, mud, snow or soft sand because it is supported by the displacement of large floatation tires. This means that it will not get bogged down in either rough terrain or soft terrain.

The advantages of a wheel have been known for centuries. I have found a way to apply the wheel to travel over soft and irregular surfaces. This is an efficient way to move people and things over water, mud, ice, snow, or soft sand.

While a spidercraft is traveling at high speeds over terrains like water a suspension system takes the shock caused by a wave rider pod rolling over the waves just like a car suspension dampens the shocks of a bump in the road for the safety and comfort of passengers. Further, a spidercraft has floatation tires which will support it while it is stationary. A suspension system connecting a cabin to several wave rider pods will continue to be active even when a spidercraft is not moving. This will enhance the safety and comfort of the passengers.

A spidercraft also operates without docking or landing facilities. All that a spidercraft needs is an open area with rocks or sand to role up on land and drop off it's cargo. For example, one use for a spidercraft is to connect bus routes between islands or an island and the mainland. For example, near Seattle there is Banbridge Island. A bus route could be created to pick up passengers on Banbridge, transport them over the sound using a spidercraft, and drop them off at their offices in downtown Seattle. The passengers would not need to transfer to other buses or ride the ferries. A freight and passenger service between Archipelago Islands like the Marianis or the Marshalls would make an ideal mission for a spidercraft because of its range and speed.

A large version of a spidercraft would make an ideal vessel for moving trucks from the mainland to islands. A loaded truck could be driven to a beach or launching area and a spidercraft would drive onto the shore, pick up the truck, and transport it at high speed to an island. This would make construction on islands without dock facilities much cheaper and faster.

Another use would be for areas where there is no port facility. For example, Somalia presented the US Army with large ships off shore with only beaches to land on. A spidercraft could be used to ferry heavy objects like tanks frown transport ships to almost any shore. The benefits of moving equipment and men on shore faster and further from the surf in rough weather are obvious.

A spidercraft can facilitate military amphibious landings where large numbers of tanks, trucks, and troops need to hit the shore very fast. A spidercraft is also very capable of landing on beaches even with heavy crashing surf. This would expand the mission windows so the enemy could not anticipate a landing as well.

A spidercraft is also an ideal scout vehicle for navy escort. A spidercraft is capable of retrieving downed aircraft or crews. A spidercraft is also a stable platform so crews could work in heavy seas and inclement weather. Unlike the helicopters it would replace an engine failure is a mere inconvenience over water instead of a life threatening situation.

Using floatation tires also nearly eliminates the danger from submerged objects common to all other types of water vehicles. Instead of sliding over or through the water a flotation tire roles over it. This means that most objects found floating on or submerged under water will simply be rolled over not collided with. This enhances the safety and security to both persons and property traveling over the water or other terrains.

In summary, a spidercraft can (1) travel fast, (2) operate over water, land, ice, mud, snow and soft sand. (3) operate with minimal drag in all these environments, (4) remain stable while stationary or moving, (5) operate without docking facilities, (6) operate with minimum potential damage to life and property in these environments and (7) is adaptable to many configurations and load conditions. A spidercraft is a revolutionary concept for transportation over soft or rough terrains. Its main features are its ability to travel at high speed over rough terrains and cushion the occupants from the shock. Spidercraft are constructed using familiar technologies like engines, propellers, planning surfaces, and wheels applied in a new way. The spidercraft concept is very adaptable and can be used in the transportation business, the search and rescue mission, the fishing business, or as a sport vehicle. Further objects and advantages of my spidercraft invention will become apparent from a consideration of the drawings and ensuing description.

SUMMARY OF THE INVENTION

The present invention provides a spidercraft which can compensate for the random pattern of rough terrain and seas which can operate at high speeds over same.

In accordance with the present invention, a spidercraft comprising at least one hull, at least one support arm extending from the hull to the wave rider pod, means for connecting said support arm to the hull and pod, and at least one flotation tire attached to each support arm.

BRIEF DESCRIPTION OF THE DRAWINGS

FIG. 6a is a perspective view of the preferred wing control mechanism 29, 30, 31, 32 on the wave rider pod. FIG. 6b shows the mechanical principles of the control mechanism.

FIG. 7 is a side view of the preferred segmented ground effect wing 12.

FIGS. 10a through 10f is a series of wave rider pod configurations including the preferred configuration showing possible flotation tire and ground effect wing positions.

FIG. 11 a through 11 f is a series of suspension configurations including the preferred configuration.

LIST OF REFERENCE NUMERALS

12—Ground Effect Wing
13—Flotation Tires
14—Steering Fork
15—Steering Collar
16—Parallelogram Suspension Trusses
17—Steering Collar Pivot Points
18—Cabin Pivot Points
19—Wave Rider Pod
20—Thrust Nozzle
21—Cabin
22—Engine Housing
23—Tire Rubber
24—latex Rubber Layer
25—Fabric Reinforcement
26—Foam Rubber Core
27—Cabin Pivot Point Pads
28—Suspension System
29—Wing Segment Levers
30—Wing Actuator Linkage
31—Steering Fork Fulcrum
32—Wing Control rod
33—Rectangular Chambers
34—Elastic Tension
35—Air Pressure
36—Wing Segment
37—Wing Pivot
38—Wing Actuator Rods

DETAILED DESCRIPTION OF THE PREFERRED EMBODIMENT

Figure 1:
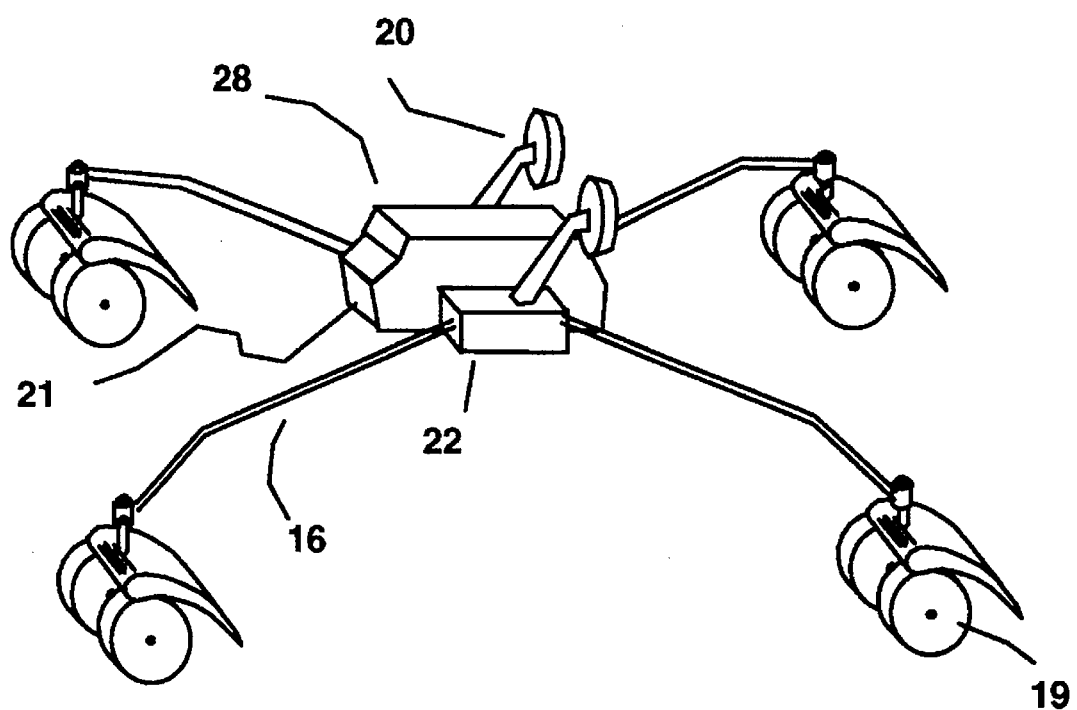
FIG. 1 is a perspective view of the preferred configuration for a spidercraft 27.

FIG. 1 A spidercraft 27 invention is unique. It has at least one cabin or hull 21 supported by at least one wave rider pod 19 consisting of at least one flotation tire 13 and may have one or more ground effect wings 12 connected to a suspension system 5.

Figure 2:
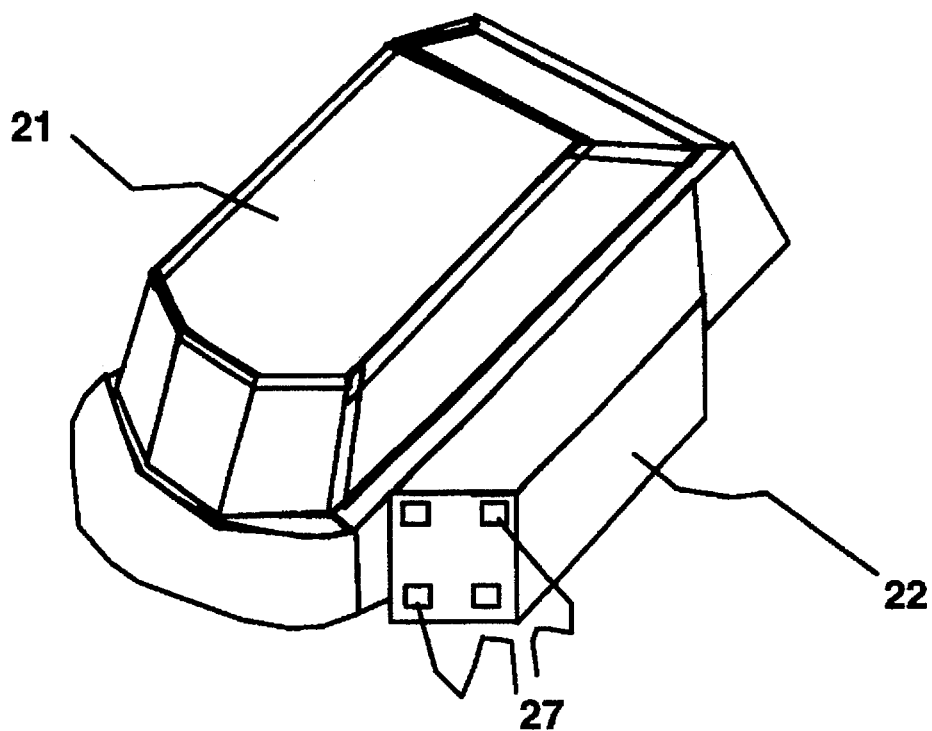
FIG. 2 is a perspective view of the preferred sport cabin 21 configuration.

FIG. 2 depicts one cabin or hull 21 configuration with two engine housings 22 attached. The truss cabin pivot point pads 27, in the preferred configuration, connect to the suspension system 28 allowing it to rotate in a vertical arc but restricting motion in any other plain. The Steering Collar Pivot Points 17 and the Cabin Pivot Points 18 are hinge connections. A hinge connection has at least one ear attached to one side of the hinge and at least two ears attached to the other. These three or more ears have aligning holes into which a hinge pin is inserted providing pivoting only motion. It is easy to imagine other cabin or hull designs that would carry automobiles, trucks, busses, passengers or military assault vehicles. This preferred sport version of the hull by no means is the only use the spidercraft could be adapted to and more configurations are obvious from the drawings and discussion.

Figure 3A:
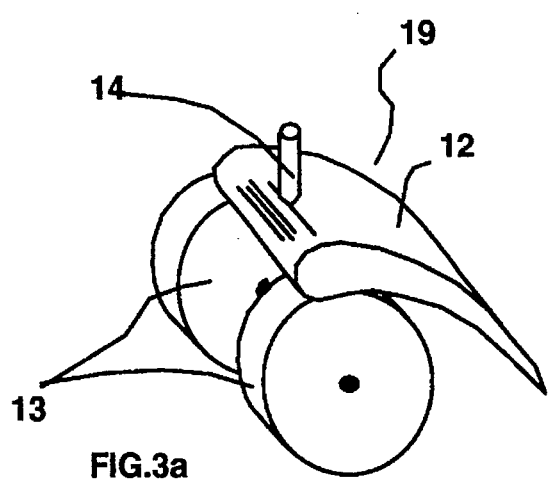
FIG. 3a, b, and c are a perspective, front, and side views of the preferred wave rider pod 19.
Figure 3B:
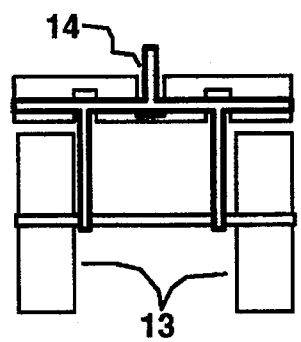
Figure 3C:
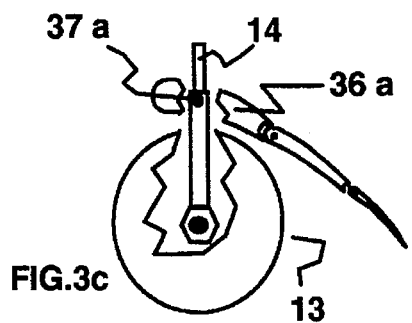

In FIG. 3a there is a perspective view of the preferred wave rider pod 19. This preferred pod has a ground effect wing 12, two planing flotation tires 13, and a steering fork 14. The steering fork is encircled by the steering collar 15. By applying a rotation to the steering fork 14 from the steering collar 15 using any mechanism common in the art the wave rider pod will rotate and change the direction of the spidercraft. FIG. 3b shows the design of the preferred steering fork 14. The steering fork has a round hollow shaft protruding through a slot in the wing around which the steering collar fits. The horizontal member extends frown the steering shaft left and right to two vertical legs extending down to the flotation tire 13 axle. The horizontal member has removable extensions which extend into the wing to provide the first wing pivot 37a. FIG. 5c shows a side view of the wave rider pod 19 with a cut away exposing the positions of the steering fork 14.

Figure 4:
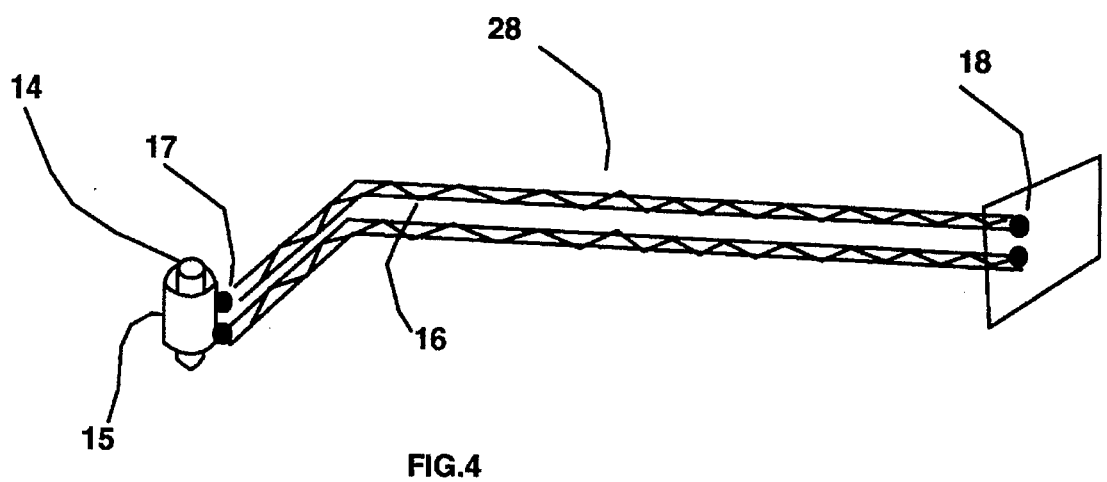
FIG. 4 is a perspective view of a suspension system and support arms making up the preferred parallelogram suspension system 28.

In FIG. 4, a suspension system 28 is arranged so that two suspension trusses 16 or support arms preferably extend away from the sides of the vessel and down to meet the wave rider pods 19. The two parallelogram suspension trusses 16 are connected on both ends with a pivot mechanism. The trusses can be made of any malleable material and constructed as a box, tube, truss or any other means. The pivot points on the cabin end 18 and the wave rider pod end 17 allow the trusses to rotate in a vertical plane while keeping the steering collar 15 and steering fork parallel to the cabin 21.

Figure 5A:
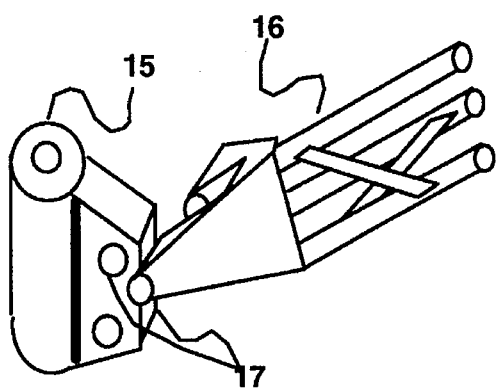
FIG. 5a and b are detailed views of the preferred steering collar pivot points 17 and the cabin pivot points 18 attaching each end of the suspension truss 16.
Figure 5B:
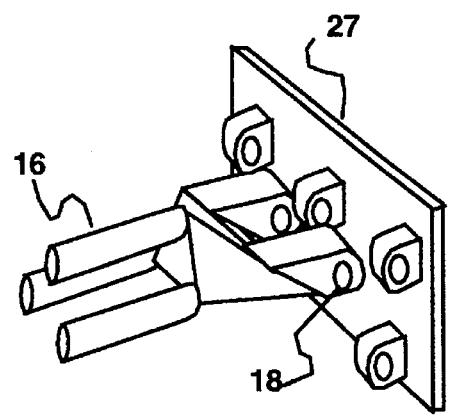

In FIG. 5a I have sketched the preferable parallelogrmn suspension truss 16 section perspective view which creates a preferably rigid support arm. This suspension truss could be made out of three steel tubes bent to the appropriate shape shown in FIG. 4 and connected with a series of steel cross members to form triangles shown in FIG. 5a. FIG. 5a shows the profile view of the truss steering collar pivot points 17 which preferably articulate around a horizontal shaft. The steering collar 15 would have a flange with holes for both an upper and lower suspension truss 16 to attach through the pin inserted in the steering collar pivot points 17. On the other end of the parallelogram suspension truss 16, FIG. 5b is the truss cabin end pivot points 18. The cabin pivot points pads attach an appropriate place on the cabin 21. Attached to the cabin pivot point pad is a series of ears which mesh with the ears on the suspension truss 16 forming a hinge like connection at the cabin pivot points 18. These pivot points 18 would preferably articulate around a horizontal shaft as well. However the attachment could use any mechanical device common in the art. The preferable number of suspension trusses 16 per wave rider pod is two. These support arms can be made of any resilient material, such as steel, aluminum or composites like fiberglass.

In FIG. 5 I have sketched the preferable truss 16 section perspective view which creates a preferably rigid support arm although a flexible one would also be covered in this patent. I have also sketched a profile view of the truss steering collar pivot points 17 which preferably articulate around a horizontal shaft. The truss cabin end pivot points 18 preferably articulate around a horizontal shaft as well. However the attachment could use any mechanical device common in the art. The preferable number of suspension trusses 16 per wave rider pod is two. These support arms can be made of any resilient material, such as steel, aluminum or composites like fiberglass.

FIG. 6a provides more details of the preferred wing control mechanism. The suspension trusses 16 rotate around the truss steering collar pivot points 17. This action changes the position of the wing actuator linkage 30 and pushes or pulls the control rod 32 up and down through the steering fork 14 which pivots through the steering collar 15. The steering fork 14 in FIG. 6 is like the steering fork on a bicycle or motorcycle. It rotates through the steering collar 15 and reaches down to both sides of the tire to the axle to rotate the tire around the vertical axis to provide steering. A steering fork resembles an eating fork with two tines. The steering fork 14 has two vertical members running from the cross member of the fork to the point that the floatation tire axle attaches. This horizontal cross member is the wing pivot "37a" shown in FIG. 6 and FIG. 7. It passes horizontally through the first wing segment 36 thereby mounting the complete wing assembly to the steering fork and allowing the attitude of the wing to change." The control rod is attached to the wing segment levers 29 which pivot around pins in the steering fork fulcrum 31. These wing segment levers control the attitude and configuration of a segmented ground effect wing 12.

FIG. 6b shows the mechanical principals of the wing control mechanism. Pivot points p1, p2, and p3 make up a triangle. A triangle is ridged unless the length of one side can change. As the suspension truss changes the angle a1 the linkages of the triangle force the wing control rod 32 to slide through the steering collar 15. The wing control rod 32 transfers the force through the steering column to another series of levers under the wing. Pivot points p4, p5, p6, p7, and p8 make up another triangle. The wing control rod 32 pushes on an angle iron p4, p5 and, p6 make up wing segment levers 29. The length of these lever segments are adjusted to give the appropriate mount of travel. The wing actuator rods 38 represented by the rod between p5 and p5 pushes or pull the edge of the wing. The wing then rotates a2 around its wing pivot point 37 represented by p8 in FIG. 6b.

FIG. 7 is a side view of the preferred articulating ground effect wing 12. It has three segments 36a, 36b, 36c although from one to any arbitrary number would work. The preferred control mechanism is a series of wing segment levers 29 that respond to the changing angle of the suspension system to the cabin. Specifically referring to FIG. 6, when the wave forces the wave rider pod 19 to rise the suspension trusses 16 slide back and forth relative to each other and the steering collar pivot points 17. The Parallelogram Suspension Trusses 16, the Wing Actuator Linkage 30, and the Steering Collar 15 are all linked together making a triangle. Any change in the angle between the suspension truss 16 and the steering collar 15 forces the third leg of the triangle to change length. This is accomplished by the Wing Control Rod sliding inside the Steering Fork 14 which is inside the steering collar 15. This sliding action is proportional to the high of the wave and is transferred through the above described mechanism to the wing segment levers 29. The wing segment levers are attached to wing actuator rods 38 which push or pull the trailing edge of the wing segments 36. The wing segments then rotate around the wing pivot points 37 to change the shape of the wing. The first wing rotates around pivot point 37 a which is also the attachment point to the steering fork 14. The horizontal bar of the steering fork 14 shown in FIG. 6 is the pivot of the wing segment 36a. This device adjusts the attack angle and the camber of the ground effect wing 12.

Figure 8:
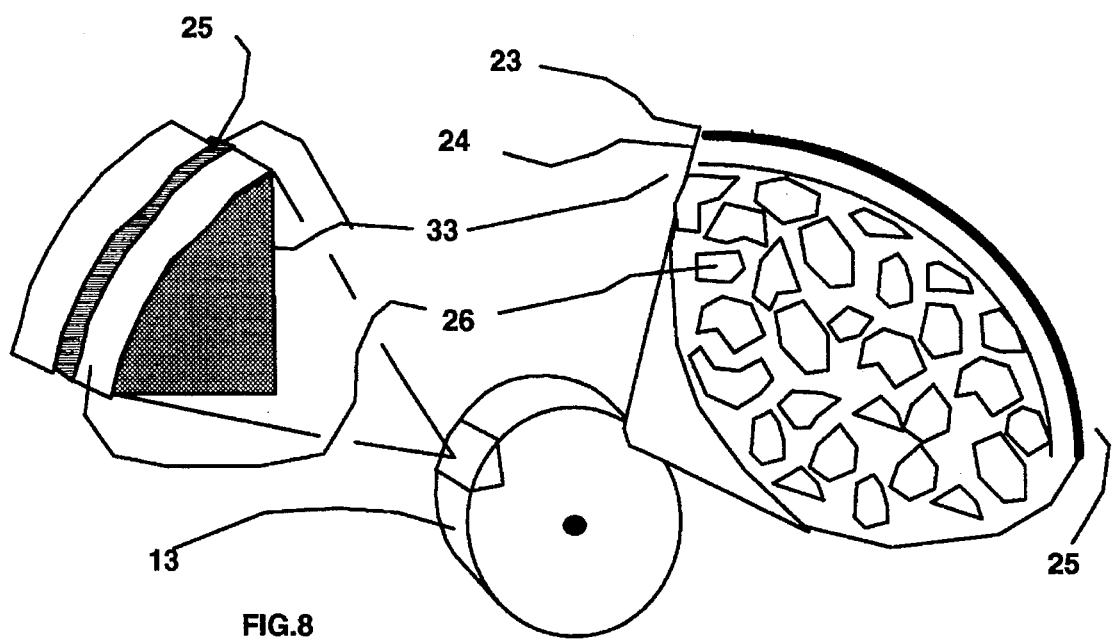
FIG. 8 is construction details of the preferred flotation tire 13 construction.

FIG. 8 provides a detailed blow up of the preferred flotation tire 13 construction. The foam rubber core 26 is molded into the required shape. The core is then covered with a fabric reinforcement 25 saturated with latex rubber 24 until an air tight flotation tire is created. Then the tire rubber 23 is applied and cured onto the existing air and foam filled core. On large flotation tires there may also be reinforcing fabric 25 used to balance the centripetal force and keep the planing surface on the bottom of the tire flat. The preferred design uses rubber products although other lighter than water materials could form the core and other abrasion resistant materials could make the casing.

Figure 9:
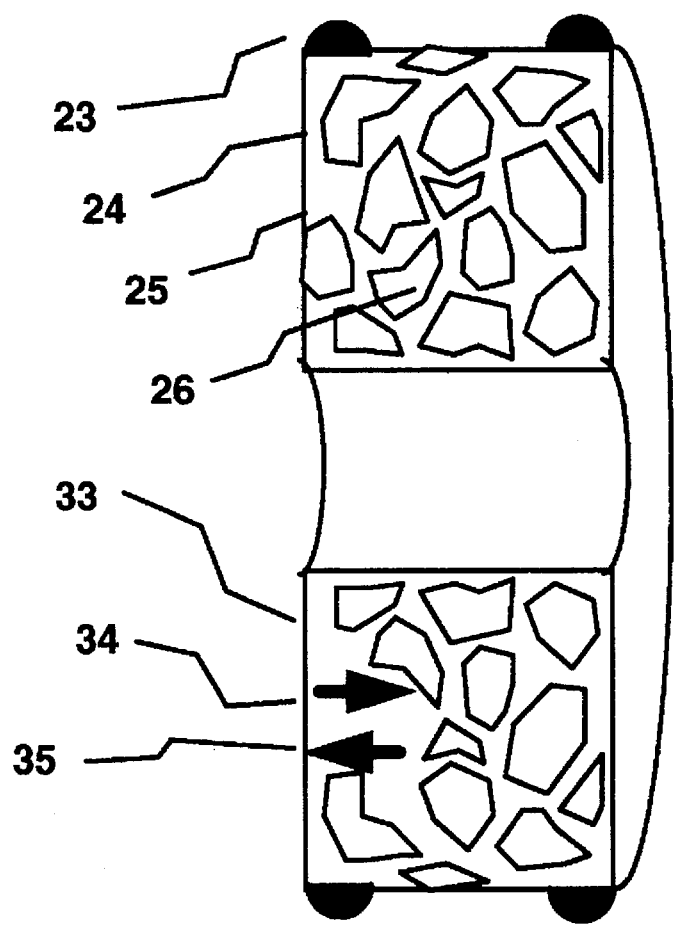
FIG. 9 provides a comparison between a standard tire construction and my Flotation tire 13 construction.

FIG. 9 provides a comparison between a standard tire construction and my Flotation tire 13 construction. The casing of a standard tire is created around a mold that creates a rounded chamber for air to fill. The shape of the chamber is determined by the wall construction. Tire tread rubber is then pored into a mold that fills in the shoulders of the round chamber to create a flat tread. In contrast, a flotation tire 13 is very large by comparison in order to displace enough water to float the spidercraft. The weight of the solid tire rubber filling the shoulder reduces the standard tire's buoyancy and therefore its effectiveness if used as a floatation tire. The principal in a standard tire is the air pushes out and the walls of the chamber contain it. With a flotation tire 13, the air pressure 35 pushes out just as it does with a standard tire but the elastic tension 34 of the foam rubber 26 maintains it's shape. Therefore, my floatation tire can be shaped to optimally provide both floatation and a flat planing surface.

FIGS. 10a through 10f provide a schematic top view of alternative wave rider pod configurations. FIG. 10a, the preferred configuration, is a pod with two tires and one ground effect wing. This is the most favorable configuration because it requires the least amount of structural strength of the steering fork and suspension trusses. Further, this preferred configuration has two tires which help to contain the air under the wing adding to its lift efficiency. FIG. 10b shows a pod with one tire and one wing. This configuration would be stable because the steering fork would hold it at the proper attitude. However, it would require more reinforcement than FIG. 10a. FIG. 10c shows a pod with a three tire configuration and ground effect wing that might be controlled by the third tire. The complexity of the control linkage would probably limit the effectiveness of the wing so it is not the preferred configuration. FIG. 10d through 10f show a one, two and three tire configuration without ground effect wings.

In FIGS. 11a though 11f, I have outlined a series of alternative configurations for the vessel's pod attachments. The preferred attachment shown in FIG. 11a provides for maximum stability without blocking the front or back of the cabin area. This maximizes both the stability and the utility of the vessel. FIG. 11b shows a four wave rider pod configuration with each pod perpendicular to a side of the craft. This would be stable but the balance of the stresses on the suspension system is unbalanced resulting in a larger verity of component parts. Further, the front, back, and sides are blocked limiting it's usefulness although it would provide the same stability as the preferred embodiment. FIG. 11c shows a two wave rider pod configuration with one pod in front and the other behind. This configuration would require an active stabilization control system because it is inherently less stable than other configurations. There are references to this type of stabilization system in the art too numerous to mention. FIG. 11d shows a three wave rider pod with a single pod in front and two in the back. FIG. 11e is another three pod configuration with two wave rider pods in the front and one in the back. Both configurations in FIG. 11d and FIG. 11e are less stable than the preferred configuration and would require a larger verity of component parts like the configuration in FIG. 11b. FIG. 11f shows a functional equivalent to the preferred configuration in FIG. 11a but the suspension system would be different. Other configurations would be anticipated by adding more pods. It is clear that there are many variations in the angle of the suspension system combined with different combinations of wave rider pods that still constitute a spidercraft.

OPERATION OF INVENTION

A spidercraft has a propulsion system, a suspension system 28 and at least one floatation tire 13. Any thrust device known in the art will do to propel a spider craft. The preferred propulsion would be an internal combustion engine driving an air propeller inside of a thrust nozzle 20.

A spidercraft works by having large floatation tires 13 that role over obstacles and rough terrain. The floatation tires 13 are large enough to support the weight of a spidercraft while the majority of the tire is above the water. These large tires function both as a friction reducing device when a spidercraft is underway and a floatation device when it is stationary. One of the benefits of flotation tires 13 is the well known reduction in friction from a wheel. A floatation tire does not slide over the water like a planing hull, it roles over it or any other surface. My invention is in part to construct a tire big enough to bring the wheel to soft surfaces like water and mud and to rough environments like heavy seas or ice flows where the wheel was never used before.

A floatation tire 13 is constructed by filling a mold with foam rubber 26. The shape of a floatation tire is determined by the shape of the molded foam rubber. Large tires may be constructed in layers of foam rubber with imbedded fabric reinforcement 25 to help resist the centripetal force of the rotating tire. The foam rubber core would form a rectangular chamber 33 appropriate to function in the intended environment. The core is then covered with layers of latex impregnated reinforcing fabric 25 until it is an air tight casing. Low pressure air 35 would then be balanced by the elastic tension 34 of the foam rubber core 26 to maintain the shape of the tire.

A pair of floatation tires 13 are connected to the hull or cabin 21 by suspension trusses 16. A suspension system 28 with springs and shock absorbers allows the wave rider pod 19 to move in concert with the waves while the cabin 21 stays relatively stable.

A suspension system also provides enough clearance under the cabin or hull 21 to avoid all but occasional contact of the hull with the crests of the waves. The wide stance of the wave rider pods provides maximum stability from the capsizing motion of the waves.

In addition to the floatation tires 13, a wave ruder pod 19 may have one or more ground effect wings 12. The increase in lift on the wave rider pod 19 as it runs over a wave peak is partially dampened by decreasing the angle of attack and or camber of the ground effect wing 12. This adjustment in the ground effect wing maintains a more or less constant lift from the wave rider pod 19. More even lift means that the suspension system 28 will not need to absorb as much shock so the cabin or hull 21 of the craft remains relatively stable.

The preferred way to adjust the ground effect wing 12 attack angle and camber is to take advantage in the change in angle between the steering fork 14 and the parallelogram suspension trusses 16. The parallelogram suspension trusses maintain the vertical orientation of the steering collar 15 which encircles the steering fork 14. This arrangement allows a fork to remain at vertical relative to the cabin facilitating the control of the ground effect wing attitude and camber of the flotation tires 13 in turns.

The steering fork 14 provides for both rotating the wave rider pod 19 for steering and transferring thrust to adjust the attitude and shape of the ground effect wing 12. The wing actuator linkage 30 attaches with a pivot to the suspension truss 16. When the floatation tire rides over a wave the angle between the steering collar 15 and the suspension truss 16 changes. This motion forces the wing actuator linkage 30 to transfer thrust through a thrust bearing to the wing control rod 32 to slide through a steering fork 14. The wing control rod then transfers thrust through a series of wing segment levers 29 to adjust the attack angle and camber of the wing. The wing segment levers could also be replaced by a series of rods and slides which would accomplish the same goal. Or a ground effect wing could be controlled using hydraulic or pneumatic circuitry to accomplish the same goal.

CONCLUSION, RAMIFICATIONS, AND SCOPE OF INVENTION

Thus the reader will see that the spidercraft can (1) travel fast, (2) operate over water, land, ice, mud, snow and soft sand. (3) operate with minimal drag in all these environments, (4) remain stable while stationary or moving, (5) operate without docking facilities, (6) operate with minimum potential damage to life and property in these environments and (7) is adaptable to many configurations and load conditions. The reader will note that none of the components of the spider craft are unique in the world. All have been used before in other ways. However, the combination of these elements in a spidercraft is unique and give the spidercraft unanticipated novel capabilities.

While my description contains many specificities, these should not be construed as limitations on the scope of the invention, but rather as an exemplification of one preferred embodiment thereof. Many other variations are possible. For example, the variations in the suspension attachment angles, the number of flotation tires used, or whether or not the wave rider pods have a ground effect wing. Accordingly, the scope of the invention should be determined not by the embodiments illustrated, but by the appended claims and their legal equivalents.

I claim:

1. A high speed waterborne vessels comprising, (a) a cabin to accommodate crew, passengers and cargo, with a means to attach at least one suspension system and at least one propulsion system, (b) said suspension system adapted to absorb shocks imparted to the suspension system; each said suspension system including means for attachment to said cabin and to at least one wave rider pod;

(c) said at least one wave rider pod having means to attach at least one flotation tire and at least one ground effect wing segment; said at least one waverider pod also having means for attachment to said suspension system; and (d) a propulsion system attached to said cabin, said suspension system, or said wave rider pod.

2. The high speed waterborne vessel of claim 1, wherein said flotation tire is formed to have a flat outer surface to provide a planing surface.

3. The high speed waterborne vessel of claim 2, wherein said flotation tire is constructed to support said cabin.

4. The high speed waterborne vessel of claim 3, wherein said flotation tire is constructed from latex foam rubber covered with fabric reinforcement, and said fabric reinforcement is saturated with cured latex rubber sufficient to create an airtight structure.

5. The high speed waterborne vessel of claim 1 wherein said ground effects wing segment has at least one pivot point permitting the angle of attack to be adjusted.

6. The ground effects wing of claim 5 wherein said ground effects wing has at least two segments with pivot points permitting the camber of said ground effects wing to be adjusted.

7. The high speed waterborne vessel of claim 1 wherein said wave rider pod has a steering fork, said steering fork passes through a steering collar providing a turning mechanism for said wave rider pod, said steering collar is attached to said suspension system with two pivot points which provide a means for transferring the vertical motion of said wave rider pod to a wing actuator linkage, and said wing actuator linkage transfers the said vertical motion through the wing control rod to said ground effect wing segment.

8. The high speed waterborne vessel of claim 1 wherein said suspension system consists of two parallel suspension trusses, said parallel suspension trusses have a pivot attachment to the cabin allowing rotation in the vertical plane and not in the horizontal plane, and said parallel suspension truss has a pivot point attachment to said wave rider pod allowing the pod to ride up and down while maintaining a constant vertical orientation.

9. The high speed waterborne vessel of claim 1 wherein said propulsion system drives air pusher propellers, and said pusher propellers are shrouded by a thrust nozzle.

10. The high speed waterborne vessel of claim 1 wherein said flotation tire is constructed from a block of latex foam rubber to support said cabin, said latex foam rubber is formed to have a flat outer surface to provide a planing surface, said latex foam rubber is covered with fabric reinforcement, and said fabric reinforcement is saturated with cured latex rubber sufficient to create an airtight structure.

11. The high speed waterborne vessel of claim 10 wherein said ground effects wing segment has at least one pivot point permitting the angle of attack to be adjusted, and said ground effects wing has at least two segments with pivot points permitting the camber of said ground effects wing to be adjusted.

12. The high speed waterborne vessel of claim 11 wherein said wave rider pod has a steering fork, said steering fork passes through a steering collar providing a turning mechanism for said wave rider pod, said steering collar is attached to said suspension system with two pivot points which provide a means for transferring the vertical motion of said wave rider pod to a wing actuator linkage, and said wing actuator linkage transfers the said vertical motion through the wing control rod to said ground effect wing segment.

13. The high speed waterborne vessel of claim 12 wherein said suspension system consists of two parallel suspension trusses, said parallel suspension truss has a pivot attachment to the cabin allowing rotation in the vertical plane and not in the horizontal plane, and said parallel suspension truss has a pivot point attachment to said wave rider pod allowing the pod to ride up and down while maintaining a constant vertical orientation.

14. The high speed waterborne vessel of claim 13 wherein said propulsion system drives air pusher propellers, and said pusher propellers are shrouded by a thrust nozzle.

* * * * *